L. L. SALFISBERG.
ATTACHING DEVICE.
APPLICATION FILED OCT. 20, 1921.

1,412,970.

Patented Apr. 18, 1922.

INVENTOR
Leroy L. Salfisberg
BY
Emery, Varney, Blair & Hoguet
his ATTORNEYS

UNITED STATES PATENT OFFICE.

LEROY L. SALFISBERG, OF NEWARK, NEW JERSEY.

ATTACHING DEVICE.

1,412,970.  Specification of Letters Patent.  Patented Apr. 18, 1922.

Application filed October 20, 1921. Serial No. 509,008.

*To all whom it may concern:*

Be it known that I, LEROY L. SALFISBERG, a citizen of the United States, and a resident of Newark, in the county of Essex and State of New Jersey, have invented an Improvement in Attaching Devices, of which the following is a specification.

The present invention relates to an improvement in attaching devices, such for example as may conveniently be utilized in connection with the securing of snap fasteners and the like to flaps, curtains or other articles. One of the objects of the invention is to provide attaching means which may readily be formed as an integral part of the fastener or other device and which will render it possible to secure such fastener or other device to a flap or the like by a simple manual operation, it being contemplated that the device can afterward be removed and the position changed if desired without destroying any of the parts.

Figure 1:
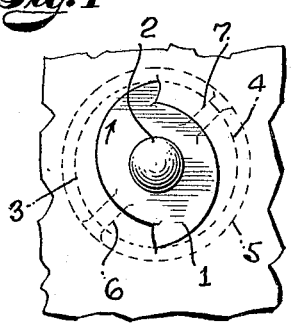

One embodiment of my invention is illustrated in the drawings accompanying the present specification, and in which, Figure 1 is a top plan view of the male portion of a snap fastener device secured to a flap or other article.

Figure 2:
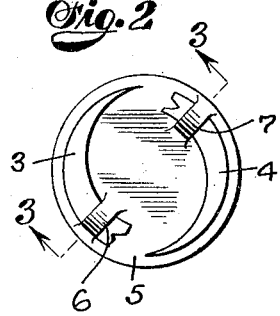
Figure 3:
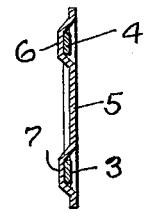
Figure 4:
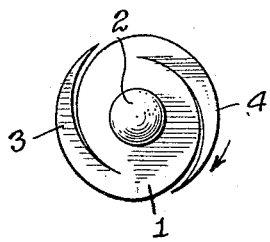
Figure 5:
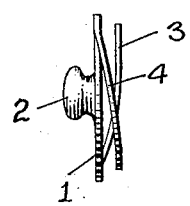
Figure 6:
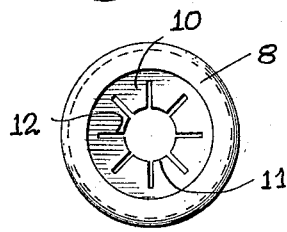
Figure 7:
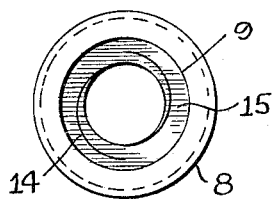
Figure 8:
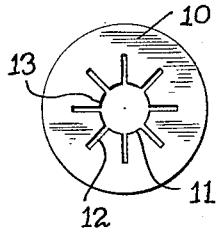
Figure 9:
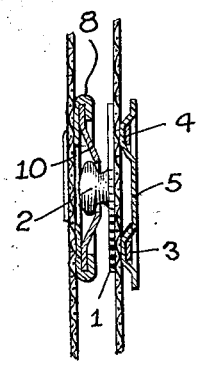
Figure 10:
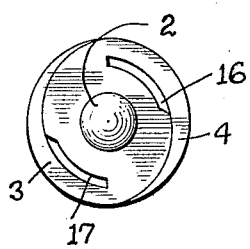

Figure 2, a top plan view of the shield associated with said device,

Figure 3, a transverse section on the line 3—3 of Figure 2,

Figure 4, a top plan view of the male portion of a snap fastener of the type illustrated in Figure 1 in connection with the flap and the shield, Figure 5, a side elevation of the fastener portion shown in Figure 4, Figure 6, a top plan view of the female portion of a snap fastener, Figure 7, a top plan view of the same with the retainer removed, Figure 8, a retainer forming part of the female portion of the snap fastener, Figure 9, a transverse section of a complete snap fastener assembled with the parts in locked relation, and Figure 10, a modified form of attaching device showing material accommodating slots.

Referring to the drawings, the attaching device forming the subject matter of my invention may conveniently be embodied in either or both members of a snap fastener such as that illustrated in Figure 9. The male member of such device, shown more particularly in Figures 4 and 5 consists of a base portion 1, a projecting button 2 and spirally disposed attaching prongs 3 and 4 which are preferably integral with the base 1, cut from the material thereof and displaced with their free ends deflected so as to be in attaching position substantially as shown in Figure 5. The prongs have curved edges which taper to a point at their free ends. In operation, to attach the male portion of the snap fastener to a flap or cover, the pointed ends of the prongs 3 and 4 will be inserted in the material, and upon twisting the device in the direction of the arrow, said prongs 3 and 4 will pierce the cloth or other material. In order to cover the prongs 3 and 4 to thereby not only protect them but also to make a more secure attachment, said prongs are adapted to cooperate with a shield 5 provided with spaced offset portions 6 and 7 forming retaining members for receiving said prongs 3 and 4. As shown in Figure 9, the prongs in this position are effectively covered on the one side by the material of the flap or cover and on the other side by the shield 5.

The same type of attaching device is applicable to the female portion of the snap fastener device. As indicated in Figures 7 and 9, the female portion of the snap fastener includes a base member 8, an inwardly turned peripheral flange 9 by means of which a spring retainer 10 is held in position to engage and retain the button 2 of the male portion. Said retainer is provided with a central opening 11 having slots 12 extending radially therefrom to form a plurality of spring retaining members 13. Where the bottom wall of the base 8 is solid or imperforate, the spring members 13 may be bent as shown in Figure 9 to make room for the button 2 between the retainer 10 and the bottom of the base member 8. The base 8 is also provided with an attaching device consisting of spirally arranged prongs 14 and 15 which, in operation, are deflected so that their ends will piece the material to which the female member is to be attached. The shield 5 may or may not be used as desired.

As shown in Figure 7, the prongs 14 and 15 are punched out of metal surrounding an opening in the base 8 instead of at the outer edge of a base member as in Figures 4 and 5. This produces a construction which is easily manufactured and which is securely attachable to fabric materials and the like by a simple twisting movement.

The mode of affixing the attaching device to any given material may be varied, for example, so that the point of the prongs, instead of being positioned adjacent to the end surface of the material, will be positioned on the same side as the base 1. This is effected by partially securing the device in position and then turning the free ends of the prongs upwardly to pierce the material a second time thus bringing the prongs back on the same side as the base 1. Where this mode of attachment is contemplated, it is desirable to allow some space between the upper end of the prong and the base 1. Thus, as shown in Figure 10, a portion of the material of the base will be cut out to form slots 16 and 17 to accommodate the material.

It is contemplated that the attaching device hereinabove described in connection with a snap fastener may be adapted to a variety of uses such as buttons, paper clips and the like, in addition to the one disclosed above in connection with the snap fastener. In this particular instance, however, the utility of the device will be apparent and includes various features such as the simplicity of the construction, the ease with which the device is applied to a supporting object such as a flap or cover, the secure fixing of the device in position when once applied and its adaptability to various kinds of types of material such for example as cloth, leather and the like.

I claim as my invention:

1. An attaching device comprising a base and material piercing prongs extending from one side thereof and at an angle thereto, said prongs having curved longitudinal edges tapering from the base to a terminal point.

2. An attaching device comprising a base and material piercing prongs extending from one side thereof and at an angle thereto, said prongs having curved longitudinal edges tapering from the base to a terminal point, and a shield for said prongs having prong engaging means projecting from one side and forming prong retaining loops.

3. An attaching device comprising a base and material piercing prongs extending from one side thereof and at an angle thereto, said prongs having curved longitudinal edges tapering from the base to a terminal point, the inner edge of each prong being spaced from an adjacent portion of the outer edge of the base to permit a thickness of the material to which the device is attached to be interposed between said prong and the base when the prong is in operative position and substantially flush with the base.

4. A snap fastener comprising a male portion and a female portion, said female portion comprising a base having an inwardly turned peripheral flange, a resilient male engaging portion, and attaching means integral with said base and comprising prongs extending from one side thereof and at an angle thereto, said prongs having curved longitudinal edges tapering to a terminal point.

5. A snap fastener comprising a male portion and a female portion, said male portion comprising a base, a projecting button, and attaching means integral with said base and comprising prongs extending from one side thereof and at an angle thereto, said prongs having curved longitudinal edges tapering to a terminal point.

6. An attaching device comprising a base having an opening and prongs disposed along the edge of said opening and extending from one side of the base and at an angle thereto, said prongs having curved longitudinal edges tapering from the base to a terminal point.

In testimony whereof, I have signed my name to this specification this 13th day of October, 1921.

LEROY L. SALFISBERG.